United States Patent [19]

Nisula et al.

[11] Patent Number: 5,004,588
[45] Date of Patent: Apr. 2, 1991

[54] PROCESS FOR REMOVAL OF HYDROGEN SULFIDE FROM GASEOUS STREAM

[75] Inventors: Scott P. Nisula, Alameda; Christopher P. O'Callaghan, San Rafael; Gerald A. Bogaczyk, Alta Loma, all of Calif.

[73] Assignee: Chevron Research & Technology Company, San Francisco, Calif.

[21] Appl. No.: 530,446

[22] Filed: Jun. 1, 1990

Related U.S. Application Data

[63] Continuation of Ser. No. 144,409, Jan. 15, 1980, abandoned.

[51] Int. Cl.$^5$ .................... C01B 17/16; C01B 17/02; C01B 31/20
[52] U.S. Cl. .................. 423/226; 23/293 S; 423/576.6
[58] Field of Search ............. 423/226, 576.6, 574 L; 23/293 S

[56] References Cited

U.S. PATENT DOCUMENTS

| | | | |
|---|---|---|---|
| 3,068,065 | 12/1962 | Hartley et al. | |
| 3,097,925 | 7/1963 | Pitts, Jr., et al. | |
| 3,199,946 | 8/1965 | Fujita et al. | |
| 3,622,273 | 11/1971 | Roberts et al. | 23/225 |
| 3,672,125 | 6/1972 | Miller | |
| 3,676,356 | 7/1972 | Roberts et al. | 252/192 |
| 3,933,993 | 1/1976 | Salemme | 423/573 |
| 3,956,473 | 5/1976 | Mimoun et al. | 423/573 |
| 4,009,251 | 2/1977 | Meuly | 423/573 |
| 4,011,304 | 3/1977 | Mancini et al. | 423/573 |
| 4,036,942 | 7/1977 | Sibeud et al. | 423/573 |
| 4,100,235 | 7/1978 | Thornwald | 261/142 |
| 4,140,735 | 2/1979 | Schumacher | 261/22 |
| 4,189,462 | 2/1980 | Thompson | 423/573 |
| 4,208,385 | 6/1980 | Robbins et al. | 423/573 |
| 4,238,462 | 12/1980 | Hardison | 423/224 |
| 4,246,244 | 1/1981 | Fox | 423/225 |
| 4,278,646 | 7/1981 | Lynn | 423/226 |
| 4,313,917 | 2/1982 | Ohta | 423/228 |

(List continued on next page.)

FOREIGN PATENT DOCUMENTS 999799 7/1965 United Kingdom.
2088839 6/1982 United Kingdom.

OTHER PUBLICATIONS

Fong et al., "Shell Redox Desulfurization Process Stresses Versatility", Oil and Gas Journal, (OGJ Report), 5/25/87, pp. 54–62.

Fong et al., "Gas Desulfurization Using Sulferox", 37th Laurance Reid Gas Conditioning Conference, May 2–4, 1987.

Howard L. Fong, "Desulfurization of Sour $CO_2$ from EOR Projects Using Sulferox, a Unique Iron-Chelate Redox Process", 2nd Annual International Enhanced Oil Recovery Conference, Anaheim, CA, Jun. 2, 1987.

Primary Examiner—Gary P. Straub
Assistant Examiner—Lori F. Cuomo
Attorney, Agent, or Firm—Burns, Doane, Swecker & Mathis

[57] ABSTRACT

This invention provides a process for removing $H_2S$ from the gaseous stream by contacting the stream with an aqueous solution of a water soluble oxidized polyvalent metal chelate catalyst in the presence of oxygen whereby the metal chelate catalyst oxidizes the hydrogen sulfide to produce elemental sulfur and the oxygen present oxidizes the reduced metal chelate catalyst to its oxidized form. This process is performed in a single reaction vessel and forms a suspension or slurry of the precipitated elemental sulfur which is maintained in suspension by the use of a dispersing agent. The process is continued until the sulfur content reaches a level of 5 percent by weight or 10 percent or more by weight of the solution, then the entire solution is discarded and replaced with a fresh solution and the process repeated.

This invention also provides a composition for $H_2S$ removal comprising a polyvalent metal chelate catalyst, a buffer and a dispersing agent. The dispersing agent preferably keeps the particle size of the precipitated sulfur as small as possible, for example, less than about 15 microns and preferably less than about 5 microns.

12 Claims, 1 Drawing Sheet

U.S. PATENT DOCUMENTS

| | | | |
|---|---|---|---|
| 4,344,863 | 8/1982 | Robbins et al. | 252/192 |
| 4,356,155 | 10/1982 | Blytas et al. | 423/226 |
| 4,368,178 | 1/1983 | Diaz | 423/226 |
| 4,374,104 | 2/1983 | Primack | 423/226 |
| 4,382,918 | 5/1983 | Diaz | 423/573 |
| 4,390,516 | 6/1983 | Blytas | 423/573 |
| 4,400,368 | 8/1983 | Diaz | 423/573 |
| 4,401,642 | 8/1983 | Blytas et al. | 423/573 |
| 4,414,194 | 11/1983 | Blytas | 423/573 |
| 4,431,616 | 2/1984 | Chou | 423/226 |
| 4,444,742 | 4/1984 | Hass et al. | 423/573 |
| 4,455,287 | 6/1984 | Primack et al. | 423/573 R |
| 4,468,929 | 9/1984 | Jernigan | 60/641 |
| 4,479,928 | 10/1984 | Voirin | 423/574 |
| 4,485,083 | 11/1984 | Blytas | 423/573 |
| 4,499,059 | 2/1985 | Jones et al. | 423/226 |
| 4,515,764 | 5/1985 | Diaz | 423/573 |
| 4,525,338 | 6/1985 | Klee, Jr. | 423/573 |
| 4,532,118 | 7/1985 | Tajiri et al. | 423/226 |
| 4,534,955 | 8/1985 | Rosenbaum | 423/573 |
| 4,536,382 | 8/1985 | Blytas | 423/437 |
| 4,547,200 | 10/1985 | Shinohara | 44/51 |
| 4,622,212 | 11/1986 | McManus | 423/226 |
| 4,649,032 | 3/1987 | Snavely et al. | 423/226 |
| 4,730,369 | 3/1988 | Nagl et al. | 23/293 S |
| 4,769,228 | 9/1988 | Romoda et al. | 423/573 R |
| 4,784,775 | 11/1988 | Hardison | 210/712 |
| 4,880,609 | 11/1989 | Naraghi | 423/226 |

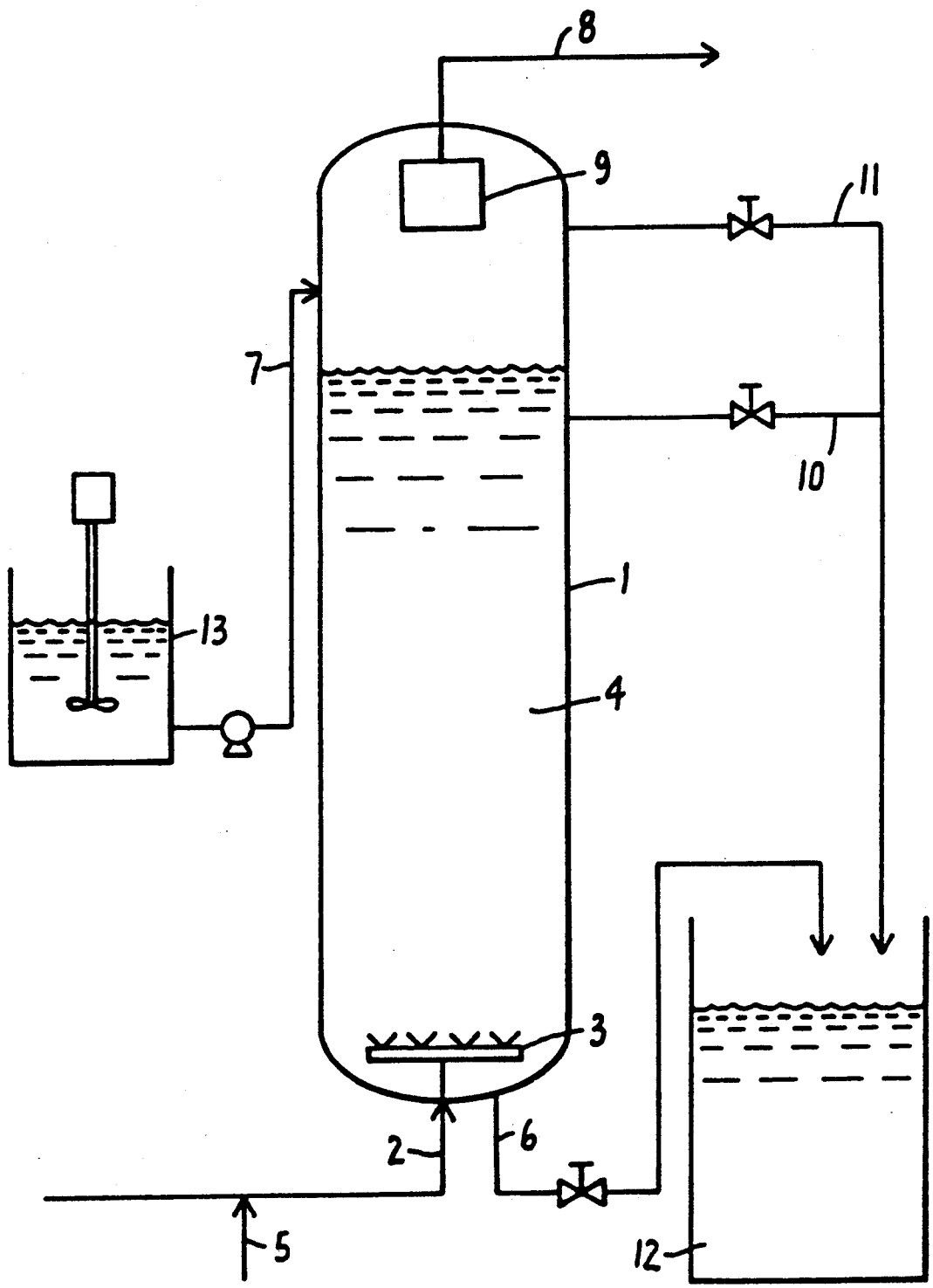

PROCESS FOR REMOVAL OF HYDROGEN SULFIDE FROM GASEOUS STREAM

RELATED APPLICATION

This application is a continuation of application Ser. No. 07/144,409 filed Jan. 15, 1988, now abandoned.

FIELD OF THE INVENTION

This invention relates to compositions and processes for removing hydrogen sulfide from gases using polyvalent metal chelate catalysts in aqueous solution.

BACKGROUND OF THE INVENTION

The removal of hydrogen sulfide from gaseous streams produced in various industrial chemical processes, oil field production and petroleum processing has become increasingly important because of the limitations on the environmental liberation and/or burning of gaseous streams containing hydrogen sulfide. Hydrogen sulfide contributes to air pollution (when released to the atmosphere or burned), is hazardous to human health, and creates an odor nuisance in very low concentrations. Federal, state and local regulations exist restricting the amount of $H_2S$, as well as $SO_2$, the combustion product of $H_2S$, that can be released to the atmosphere. Further, most natural gas sales contracts between the producers and end users, utilities, or pipeline companies require that the $H_2S$ content be minimal, usually below 4 ppmv. Therefore, it is usually necessary to remove $H_2S$ from these gases before end use, sale, or even emission to the atmosphere.

There are many processes known in the art for removing hydrogen sulfide from gaseous streams including caustic scrubbing, as exemplified by the disclosure in U.S. Pat. No. 2,747,962 to Heitz et al., scrubbing with aqueous solution of a water soluble nitrite such as sodium nitrite as disclosed in U.S. Pat. No. 4,515,759 to Burnes et al., and numerous other processes. The present invention relates to the use of an aqueous solution of a polyvalent metal chelate catalyst, such as a chelated iron redox catalyst, for the oxidation of hydrogen sulfide in a gaseous stream to produce elemental sulfur precipitate in the solution.

The use of a polyvalent metal chelate catalyst in aqueous solution to oxidize hydrogen sulfide in a gaseous stream to produce elemental sulfur in the solution is well known in the art and can be illustrated by the following representative disclosures which are incorporated herein by reference: U.S. Pat. No. 3,068,065 to Hartley et al., U.S. Pat. No. 3,097,925 to Pitts et al., U.S. Pat. No. 3,199,946 to Fujita et al., U.S. Pat. No. 3,676,356 to et al., U.S. Pat. No. 3,933,993 to Salemme, U.S. Pat. No. 4,009,251 to Meuly, U.S. Pat. No. 4,011,304 to Mancini et al., U.S. Pat. No. 4,036,942 to Sibeud et al., U.S. Pat. No. 4,189,462 to Thompson, U.S. Pat. No. 4,238,462 to Hardison, U.S. Pat. No. 4,356,155 to Blytas et al., U.S. Pat. Nos. 4,368,178, 4,382,918, 4,400,368, and 4,515,764 to Diaz, U.S. Pat. No. 4,374,104 to Primick, U.S. Pat. Nos. 4,390,516 and 4,414,194 to Blytas, U.S. Pat. No. 4,431,616 to Chou, U.S. Pat. No. 4,499,059 to Jones et al., U.S. Pat. No. 4,525,338 to Klee, U.S. Pat. No. 4,532,118 to Tajiri et al., U.S. Pat. No. 4,534,955 to Rosenbaum, U.S. Pat. No. 4,649,032 to Snavely et al., and "Shell Redox Desulfurization Process Stresses Versatility" by Fong et al., *Oil and Gas Journal* (OGJ Report), May 5, 1987, pp. 54–62.

As can be seen from the disclosures of the above patents and articles, the hydrogen sulfide removal processes using aqueous solutions of polyvalent metal chelate catalyst include various multistage processes for (a) oxidizing hydrogen sulfide to elemental sulfur in a gas-liquid contacting vessel, (b) separating the sulfur from the aqueous solution by settling, frothing, filtration or other means for removing the solid elemental sulfur, (c) regenerating the reduced polyvalent metal chelate catalyst to its oxidized form in a separate regeneration vessel and (d) recycling the regenerated metal chelate catalyst to the contacting vessel for further contact with the hydrogen sulfide containing gaseous stream. In order to effect the settling, frothing, flotation, filtration, hydrocloning or other separation of the sulfur from the solution, it is an objective of these prior art processes to agglomerate the sulfur particles or otherwise produce as large sulfur particles as possible to make the separation of the sulfur from the solution easier and more effective.

The amount of $H_2S$ present in gas streams varies, as can the size of the gas stream, and thus the amount of $H_2S$ that must be removed on a daily basis can vary from as high as thousands of tons per day to as little as a few pounds per day. Many commercial processes exist for $H_2S$ removal, and the selection of the process is strongly dependent on the daily amount to be removed. For instance, for large daily amounts (greater than about 5 ton/day) the typical process configuration involves $H_2S$ separation and recovery with an alkonolamine process followed by conversion to sulfur in the Claus process. However, for small scale processing (e.g., less than 500 lb./day $H_2S$) this scheme is expensive and impractical due to the complicated nature of the equipment. Thus, removal of small daily amounts of $H_2S$ presents a special case for economical processing.

Several processes are commercially available for the removal of small amounts of $H_2S$. A key feature of these processes is that they are typically batch chemical type processes, with simple, low cost equipment. The "iron sponge" process uses iron oxide impregnated wood chips in a dry bed to remove $H_2S$ from the gas that is passed through the bed by reacting the $H_2S$ to form iron sulfide When the material is spent, it is removed from the bed and disposed of in an acceptable manner. The disadvantage with this process is that, although the chemical itself is relatively inexpensive, the loading and unloading procedures are cumbersome and labor intensive, plus the spent material is pyrophoric and often considered a hazardous waste.

Another commercial process uses an aqueous solution of sodium nitrite to react with $H_2S$ when the sour gas is passed through a static fluid column in a single vessel. When the nitrite is all used up, the material is discharged and discarded as Class II waste, and a fresh charge is loaded into the vessel. A disadvantage of this process is that the sodium nitrite chemical solution is comparatively expensive.

The use of chelated iron a redox catalyst for hydrogen sulfide oxidation has been used in several commercial processes, which are based on the chemistry:

$2Fe^{+++}(\text{chelate}) + H_2S = 2Fe^{++}(\text{chelate}) + S + 2H^+$
$2Fe^{++}(\text{chelate}) + \frac{1}{2} O_2 + 2H^+ = 2Fe^{+++}(\text{chelate}) + H_2O$ For a net reaction of: $H_2S + \frac{1}{2} O_2 = S + H_2O$ These processes involve complicated flow schemes, usually with separate absorbers, regenerators, settling tanks, pumps, and filters, centrifuges, etc., for recovery of the solid sulfur from the solution. Thus, they are capital intensive and complicated to operate. Therefore, these processes are generally not used for removal of small amounts of $H_2S$ where simple processes like the "iron sponge" and sodium nitrite processes are favored.

It is an object of this invention to provide a simplified aqueous polyvalent metal chelate process for removing hydrogen sulfide from gaseous streams and to thereby provide a more economical process.

It is another object of this invention to provide an aqueous polyvalent metal chelate composition and method for removing small daily amounts of $H_2S$ from gas streams on an economical basis.

It is a further object of this invention to provide an aqueous polyvalent metal chelate composition and a method for essentially complete removal of $H_2S$.

Another object of this invention is to enable the removal of $H_2S$ in a simple process, using simple equipment that requires little operation attention and/or maintenance.

Yet another object of this invention is to provide catalytic method for $H_2S$ conversion to sulfur in the presence of oxygen in a single gas/liquid contact vessel.

Another object of this invention is to disperse the precipitated sulfur to very small particles to prevent settling, foaming, frothing and fouling in the gas/liquid contact zone.

SUMMARY OF THE INVENTION

In one aspect this invention provides a composition for removing hydrogen sulfide from a gaseous stream in the presence of oxygen comprising an aqueous solution containing:

(a) from about 0.005 to about 0.2 percent by weight of a polyvalent metal in a chelate complex with;

(b) from about 0.005 to about 1 percent by weight of a chelating agent;

(c) up to about 10 percent by weight of a pH buffer;

(d) at least about 0.001 percent of a dispersing agent for dispersing the sulfur particles present in the aqueous solution; and (e) up to about 0.02 percent by weight of an anti-foaming agent.

In another aspect, this invention provides a process for removing hydrogen sulfide from a gaseous stream which comprises contacting said hydrogen sulfide containing gaseous stream with an aqueous solution of a water soluble oxidized polyvalent metal chelate catalyst to convert the hydrogen sulfide to particulate elemental sulfur and reduce the polyvalent metal chelate catalyst, said contacting taking place in the presence of sufficient oxygen for oxidizing the reduced polyvalent metal chelate catalyst to its oxidized state, thereby forming a suspension of the particulate elemental sulfur in said aqueous solution, continuing said contacting until the particulate elemental sulfur reaches a predetermined percent by weight of the aqueous solution, discarding at least a portion of the aqueous solution containing the suspension of particulate elemental sulfur, and replacing the discarded aqueous solution with fresh aqueous solution of said water soluble oxidized polyvalent metal chelate catalyst for contact with additional hydrogen sulfide containing gaseous stream.

In another aspect, this invention provides a process for removing hydrogen sulfide from a gaseous stream which comprises contacting said hydrogen sulfide containing gaseous stream with an aqueous solution of water soluble oxidized polyvalent metal chelate catalyst to convert the hydrogen sulfide to particulate elemental sulfur and reduce the polyvalent metal chelate catalyst, said contacting taking place in the presence of sufficient oxygen for oxidizing the reduced polyvalent metal chelate catalyst to its oxidized state, thereby forming a suspension of particulate elemental sulfur in said aqueous solution wherein the aqueous solution contains an effective amount of a dispersing agent for maintaining the particulate elemental sulfur in the form of dispersed particles and maintaining said sulfur particles in suspension in the aqueous solution.

In another aspect, this invention provides a process for removing hydrogen sulfide from gaseous stream which comprises contacting said hydrogen sulfide containing gaseous stream with an aqueous solution of a water soluble oxidized polyvalent metal chelate catalyst to convert the hydrogen sulfide to particulate elemental sulfur and reduce the polyvalent metal chelate catalyst, said contacting taking place in the presence of sufficient oxygen for oxidizing the reduced polyvalent metal chelate catalyst to its oxidized state, thereby forming and maintaining a suspension of the particulate elemental sulfur in said aqueous solution wherein the average particle size of the particulate elemental sulfur is less than about 15 microns.

DESCRIPTION OF THE INVENTION

The present invention provides a process for removing hydrogen sulfide from a gaseous stream by contacting the gaseous stream with an aqueous solution of a polyvalent metal chelate catalyst in a single contact/reaction zone in the presence of oxygen without the necessity of removing the elemental or precipitated sulfur from the solution. This is accomplished in its most fundamental form by keeping the precipitated elemental sulfur in a dispersed slurry or suspension in the solution and not allowing the sulfur to agglomerate, settle, foam or froth. Through the use of appropriate dispersing agents and anti-foaming agents, the dispersed particulate elemental sulfur content of the aqueous solution can be increased to at least about 1 or 2 percent by weight of the aqueous solution, preferably about 4 or 5 percent, more preferably about 8 percent, and in many cases can be about 10 percent or greater and still be maintained in aqueous slurry or suspension form because of the dispersing agent. When the solution reaches a desired or predetermined maximum percent by weight of dispersed and/or suspended elemental sulfur precipitate particles, preferably the entire solution is removed from the contact zone and discarded and disposed of. Fresh polyvalent metal chelate catalyst solution is then added to replace the discarded solution and the process resumed until the dispersed precipitated sulfur particles again reaches the desired concentration in the solution and the cycle again repeated. If desired, the solution containing the precipitated sulfur particles can be removed in a small continuous stream and discarded, and fresh catalyst solution can be added continuously to replace the withdrawn and discarded solution. This variation of the process of this invention can serve to remove sufficient sulfur from the contact vessel and keep sufficient metal chelate catalyst present without shutting down the process to replace all the solution at once, while still providing the benefits of not having to operate separate sulfur separation equipment or separate catalyst regeneration equipment. This variation of the process can be particularly advantageous when low levels of metal chelate catalyst are sufficient for conversion of the $H_2S$ in the gaseous stream being treated. The process of this invention eliminates the necessity of separating the precipitated sulfur from the solution which is one factor which makes the process of the present invention much more economical to operate than conventional $H_2S$ removal processes. The spent solution containing the dispersed slurry of elemental sulfur particles can be disposed of in conventional methods as a low-level contaminate, for example, by evaporation in holding ponds.

In one method of basic operation of the process of the present invention for removing $H_2S$ from a gas stream using the above-described composition, the process comprises:

(a) contacting the sour gas stream with the above composition to effect $H_2S$ conversion to sulfur precipitate particles;

(b) maintaining at least some ferric iron in solution by having sufficient oxygen continuously present to regenerate at least a portion of the ferrous iron to ferric iron;

(c) continuing flow of the gas through the solution until the reaction of $H_2S$ has formed enough elemental sulfur particles to make the slurry too thick for continued operation;

(d) stopping the gas flow;

(e) discharging the solution;

(f) recharging the reactor with a fresh batch of the above composition; and (g) restarting the gas flow as in step (a).

In this process it is believed that $H_2S$ is transported from the gas phase to the liquid phase by mass transfer where it dissolves in the solution that is pH buffered, preferably to a pH between 6.5 and 8.5. It is preferred to operate at a higher pH because higher pH increases the absorption rate of $H_2S$ and improved scrubbing is observed. The $H_2S$ then reacts with ferric ion in solution and is oxidized to elemental sulfur while the ferric ion is reduced to ferrous ion. The sulfur appears as small particles that remain in suspension in the liquid phase. The ferrous ion is reoxidized back to ferric ion by oxygen present. Thus the net reaction is that of one mole $H_2S$ reacting with $\frac{1}{2}$ mole oxygen to produce sulfur and water as described above.

The single contact zone used in the process of the present invention is made possible by the presence of oxygen in the system. Oxygen is frequently present in the gaseous streams being treated. However, if sufficient oxygen is not already present in the gaseous stream being treated, additional oxygen must be added to the gaseous stream or added to the contact zone in sufficient quantity to assure the oxidation of the reduced polyvalent metal chelate catalyst back to its oxidized form. This oxidation of the reduced metal chelate catalyst by oxygen present in the solution occurs essentially simultaneously with the oxidation of the hydrogen sulfide to produce elemental sulfur by the reduction of the polyvalent metal chelate catalyst. In the process of the present invention there is no need for a separate zones or vessels for contact and oxidizing the hydrogen sulfide containing gas and for regeneration of the reduced metal chelate catalyst.

The gaseous streams for which the present invention is suitable for treatment and removal of hydrogen sulfide includes any conventional gaseous stream which has typically been treated for the removal of hydrogen sulfide using various aqueous solutions, particularly the solutions containing water soluble nitrate and solutions containing polyvalent metal chelate catalysts. The process of the present invention is particularly suited for treating gaseous streams containing low levels of hydrogen sulfides such as less than 1000 ppm, but the process of the present invention can be used to effectively and economically to remove essentially all of the hydrogen sulfide in a gaseous stream containing 20000 ppm or more of hydrogen sulfide The higher the hydrogen sulfide content in the gaseous stream, as well as the higher the flow rate of the gaseous stream, will dictate how often the aqueous solution of the polyvalent metal chelate catalyst will have to be discarded and replaced with a new solution, which will also be determined by the level of dispersed sulfur precipitate in the solution.

The process of the present invention is highly efficient and effective. For example, a gaseous stream containing 500 ppm hydrogen sulfide can be treated in a single pass through the single contact zone of the present invention to produce a gaseous stream containing less than 4 ppm hydrogen sulfide. As will be recognized by one skilled in the art, the efficiency and effectiveness of the process of the present invention will depend upon various factors, as discussed herein, which are conventionally known to affect the hydrogen sulfide oxidation to sulfur in an aqueous polyvalent metal chelate solution.

The gaseous streams which can be treated by the process of the present invention can contain various materials and components such as carbon dioxide, nitrogen, etc. The gaseous stream should not contain any significant liquid hydrocarbons or other materials which may interfere with the aqueous solution of the polyvalent metal chelate catalyst. When other components such as acid gases like carbon dioxide are present, it will be necessary to maintain the pH of the aqueous solution in the desired range by use of a conventional buffer material or, alternatively, steps can be taken to prevent the carbon dioxide or other materials from being absorbed in the aqueous solution such as a pre-scrubbing to remove those materials before the gaseous stream contacts the polyvalent metal chelate catalyst solution according to the process of this invention or, in some cases, the contact time of the gaseous stream with the aqueous solution of the present invention can be kept short enough so that the hydrogen sulfide is absorbed into the solution and is oxidized, but the other materials such as carbon dioxide are not absorbed into the aqueous solution. Other components in the gaseous stream can be dealt with by one skilled in the art as conventionally recognized in the process of treating hydrogen sulfide containing gases with aqueous solutions of polyvalent metal chelate catalyst.

It is essential that the oxygen content of the gaseous stream be sufficient to provide the necessary oxygen for oxidizing the reduced polyvalent metal chelate catalyst to its oxidized form in the solution in the contact zone according to the present invention. If the gaseous stream does not contain sufficient oxygen, oxygen may be added directly to the gaseous stream in the form of air or other oxygen-containing gas. Alternatively, the oxygen or oxygen-containing gas can be bubbled directly into the aqueous solution However, it is in general preferred that the oxygen or oxygen-containing gas merely be mixed with the gaseous stream before it is contacted with the aqueous solution according to the present invention in order to achieve better mixing and distribution of the oxygen in the aqueous solution.

Although stoichiometrically only 0.5 mole of oxygen is required per mole of hydrogen sulfide, it is in general desired to use excess oxygen in the process of the present invention. Thus, a ratio of at least about 2 moles oxygen per mole of hydrogen sulfide can be used as well as higher ratios, such as 10:1 or even 100:1. Since the oxygen is consumed in the process of the present invention, the present invention can provide the added benefit of the reducing oxygen in the gaseous stream being treated. This can be particularly advantageous in gaseous streams such as natural gas production from oil fields. The process of the present invention can simultaneously reduce the hydrogen sulfide as well as the oxygen content of the natural gas and thereby produce a gas stream suitable for sales into residential uses. For example, a natural gas stream containing 2,500 ppmv oxygen and 1,000 ppmv hydrogen sulfide can be treated by the process of the present invention to produce the gas having less than 4 ppmv hydrogen sulfide and about 2,000 ppmv oxygen.

The pH of the aqueous solution should be maintained between about 6.5 and about 8.5. While the process may be operated at pH's lower or higher than this preferred range, one skilled in the art will recognize that when the pH is at a low level, the rate of absorption of the hydrogen sulfide into the solution will decrease. Also, if the pH is allowed to increase, the likelihood that metal hydroxides will form as precipitates will be increased. It should be noted that the pH may be quite high, such as 10 or even 12 when a solution is first put into use, but will quickly drop to the desired once operation begins. Preferably, the pH should be maintained in the range of about 7 to about 8. Buffering agents are normally used to maintain the pH in the desired range and compensate for any acidic or other materials which may be absorbed into the aqueous solution of the gaseous stream being treated. Some preferred buffering agents are alkaline earth metal bicarbonates, carbonates and hydroxides, preferably sodium bicarbonate, but other buffering agents known in the art may be used.

The temperatures at which the process of the present invention perform are ambient condition temperatures but lower or higher temperatures may be used. The pressures at which the process of the present invention can be operated range from 1 atmosphere to 1000 psi or higher. Basically, the process of the present invention can be used at any prevailing gas stream pressures. Higher pressures usually increase the rate at which the hydrogen sulfide and oxygen will go into the solution. Since hydrogen sulfide goes into solution fairly rapidly, particularly at alkaline pH, a rate-limiting factor on the process of the present invention is the rate the oxygen will go into solution. Therefore, it is usually advantageous to have a higher oxygen partial pressure.

The equipment useful in the process of the present invention need only comprise a single vessel for holding the polyvalent metal chelate solution and contain means for dispersing the gaseous stream in the vessel for contacting the gaseous stream with the aqueous solution, typically by bubbling the gas stream through the aqueous solution. Thus, the equipment is very similar to the equipment that is used in the sodium nitrite processes and the caustic scrubbing processes. For the process of the present invention it is desirable to have a corrosion resistant vessel, such as an amine cured epoxy coating or liner in a carbon steel vessel, because the solutions and compositions of the present invention are mildly corrosive to steel.

The gas-liquid contact time is not particularly critical in the operation of the present invention provided that sufficient contact time is allowed for the hydrogen sulfide to be absorbed into or dissolved in the aqueous solution. It is necessary the contact time also be sufficient to allow the oxygen present in the gaseous stream to likewise be absorbed into or dissolved in the aqueous solution. Thus, conventional contact times for removal of $H_2S$ from a gas stream by contacting it with a polyvalent metal chelate catalyst solution can be used, such as in the range from about 1 second to about 270 seconds or, more preferably, in the range of about 2 seconds to about 150 seconds, as disclosed in U.S. Pat. Nos. 4,414,194 and 4,515,764. In some cases, however, it may be desirable, through the use of special mixing equipment such as a static mixer, to use short contact times of less than 1 second or even less than 0.1 second, as disclosed in U.S. Pat. No. 4,649,032. However, when such short contact times are used, which may be adequate for the $H_2S$ mass transfer, it may be necessary to provide a separate oxygen input stream into the aqueous solution in order to have the necessary sufficient oxygen present in the solution. It is important to have an adequate and continuous supply of oxygen in the solution.

In connection with the contact time, defined as the volume of the aqueous solution in the vessel divided by the total gas flow rate, it is also useful to determine the superficial velocity of the gas stream through the aqueous solution, defined as the gas flow rate divided by the cross-section area of the aqueous solution in the vessel. Although the superficial velocity may vary over a wide range, depending on the size and shape of the vessel holding the aqueous solution, one generally useful guideline is to have a superficial velocity in the range of about 0.01 to about 0.15 feet per second. In many applications, it is useful to design the vessel and flow rate for a superficial velocity of about 0.1 foot per second which, when combined with a 5 to 10 foot height of aqueous solution in the contact vessel, will provide a contact time of about 50 to about 100 seconds. However, an increased gas flow rate can reduce the contact time down to about 1 or 2 seconds and still be sufficient for effective removal of the hydrogen sulfide from the gas stream by the process of the present invention.

As will be recognized by one skilled in the art, the actual superficial velocity and contact time selected for use in the present invention will be determined by the mass transfer of the hydrogen sulfide and particularly the oxygen from the gaseous stream into the aqueous solution. Consequently, other conventional factors such as bubble size, flow rates, operating pressures, partial pressures of hydrogen sulfide and oxygen, as well as the characteristics of the equipment used, such as the gas sparger, mixing baffles, static mixers, etc., all will affect the design criteria for a desired capacity and efficiency of a unit using the process of the present invention. Another factor which influences selection of flow rates is the desire in the present invention to minimize foaming and frothing still while maintaining sufficient agitation in the solution to assure full and efficient contact between the gas and the liquid as well as to aid in preventing settling of the suspended particles of dispersed elemental sulfur.

The polyvalent metal chelate catalyst useful in the present invention are conventional and well known in the art, as enumerated by the references set forth in the background section of this specification and incorporated herein by reference. The preferred metal is generally iron, and the preferred chelating agents are usually aminopolycarboxylic acids such as EDTA, HEDTA, DTPA, NTA as well as sodium salts thereof. Likewise, the buffer materials useful in the present invention for maintaining the pH at the desired level are conventional in the art as described in said references. Preferred buffering agents are usually alkaline earth metal bicarbonates, carbonates or hydroxides with the most commonly used being sodium bicarbonate.

While the process of the present invention will operate at lower levels of sulfur particles in the aqueous suspension without a sulfur dispersing agent present, it is desired for economic commercial operation to include a dispersing agent to enable the operation of the process to higher levels of the dispersed solid sulfur precipitate particles in the aqueous solution, such as levels of about 5 percent to about 8 percent by weight sulfur based on the weight of the aqueous solution or even about 10 percent or more by weight sulfur, before the aqueous solution is discarded and replaced. The addition of a sulfur dispersing agent is not only desirable in order to keep the particles from agglomerating together, but is also usually desirable because the sulfur particles have a tendency to attach to rising gas bubbles and form a froth or foam at the top of the solution. Further, if not adequately dispersed, the sulfur particles also tend to be sticky and can foul reactor internals, or can settle and plug the bottom of the reactor. Adding a dispersing agent helps ensure that the sulfur will remain homogeneously distributed throughout the aqueous liquid phase due to the minor agitation caused by the rising gas bubbles, and not have a tendency to stick to the process equipment. Dispersing agents such as the water soluble sodium salts of ethoxylated monyl phenol half esters of sulfosuccinate acids available from American Cyanamid, Chemical Products Division, under the trademark "Aerosol A-102" and the liquid water compatible sodium salts of polymerized alkyl naphthalene sulfonic acids available from W. R. Grace & Co., Organic Chemicals Division, under the trademark "Daxad 14B" are useful in the process of the present invention. The dispersing agent used in the present invention should be those dispersing agents which do not significantly promote foaming and frothing of the sulfur particles. Additional dispersing agents which are useful in the present invention will be apparent to one skilled in the art of aqueous dispersions and in particular generally include dispersants which are useful in aqueous pigment systems and are preferably those of lower surface tension properties since increasing the surface tension in the aqueous solution composition system of the present invention may decrease the mass transfer of oxygen and possibly the hydrogen sulfide into the aqueous solution in the process of this invention. Dispersants useful in this invention may be selected from the known classes of dispersing agents which are suitable for use in aqueous systems, such as pyrophosphates, saccharin, polyacrylates, aminomethylpropanols, polycarboxylates, polyacrylic acids, salts of carboxylated polyelectrolytes (particularly the "Gradol" 250 and 300 series from Graden Chemical which are non-foaming), lignosulfonate salts, acetylenic diol blends (particularly the low foaming "Surfynol" TG series from Air Products & Chemicals), sodium salts of polymeric carboxylic acids (such as the low foaming "Tamol" 850 or 960 from Rohm and Haas Co.) as well as other aqueous system dispersants known in the art.

The dispersing agents are typically used in the present invention in the range of about 10 ppmw to about 200 ppmw of the aqueous solution, preferably in the range of about 15 to about 150 ppmw, and most preferably in the range of about 20 to about 100 ppmw in the aqueous solution. The dispersing agent may be added to the aqueous solution at the beginning of the process or may be added to the solution after the dispersed sulfur particle content has reached some predetermined level, such as 2, 5 or 8 percent by weight of the aqueous solution.

In the present invention it is desirable to keep the average particle size of the precipitated sulfur as small as possible for easier dispersion in the aqueous solution, particularly at higher sulfur content such as 8 to 10 percent by weight or more. In conventional $H_2S$ removal processes including conversion to elemental sulfur, it has been desirable to produce large particle sizes, particularly large agglomerates of sulfur particles to aid in separation from the solution by filtration, frothing and flotation, settling or the like. Contrary thereto, in the present invention it is generally desirable to keep the average sulfur particle size under about 15 microns and preferably under about 10 microns. In many applications of the process of the present invention it is desirable to keep the average particle size of the sulfur precipitate in the aqueous solution less than about 5 microns, preferably less than about 4 microns, more preferably less than about 3 microns and most preferably in the range of about 2 microns or less.

It is also useful in many instances to use an anti-foaming agent to help prevent frothing or foaming of the solid sulfur precipitate particles in the aqueous solution. Some anti-foaming agents tend to promote agglomeration of the sulfur particles and should be avoided because agglomeration and settling of the sulfur particles are undesirable in the process of the present invention. Therefore, the anti-foaming agents should be selected and used in quantities so that the anti-foaming agent will not unduly promote the agglomeration and settling of the dispersed sulfur particles in the suspension in the aqueous solution. It is usually preferred not to add the anti-foaming agent until it is needed to prevent or dissipate the presence of a foam. However, in some cases the anti-foaming agent can be added to the solution at the start of the process. In the most efficient operation of the process of the present invention, settling of the solid sulfur particles can be avoided by keeping the sulfur particles dispersed in suspension or slurry form so that when the aqueous solution is removed from the contact vessel and discarded, all of the elemental sulfur is removed and discarded with the solution. As will be recognized by those skilled in the art, the sulfur particle dispersion in the aqueous solution can be aided to some extent by the agitation from the bubbles of the gaseous stream moving upwardly through the aqueous solution. It has also been observed that certain anti-foaming agents also may tend to slow the rate at which oxygen is dissolved from the gaseous stream into the aqueous solution. Therefore, the anti-foaming agent should be selected and used in amounts which will not unduly interfere with the mass transfer of the oxygen from the gaseous state into the aqueous solution. Examples of anti-foaming agents useful in the present invention are the "SAG" GT series from Union Carbide, the "Sulfonal" series from Air Products and the "FG 10" series of silicone anti-foamers from Dow Corning The anti-foaming agents are typically used in the present invention in as small amounts as will provide the desired or necessary control of foaming, which is usually less than about 200 ppmw, more preferably less than about 100 ppmw, and most preferably about 50 ppmw in the aqueous solution. In many instances, only 5 to 10 ppmw of anti-foaming agent may be needed. As with the dispersing agent, the anti-foaming agent may be added to the fresh solution at the beginning of the process or may be added at some predetermined point in the process when the weight percent of the solid sulfur precipitate particles reach a certain level, such as 2, 5 or 8 percent by weight. On the other hand, the process can be monitored and the anti-foaming agent added only when foaming is actually present in the contact vessel.

The process of the present invention can be better explained and understood by reference to the drawing and the specific examples which follow.

BRIEF DESCRIPTION OF THE DRAWING

In reference to the drawing in this application, a typical equivalent arrangement for the process of the present invention is shown.

Contact vessel 1 is a typical gas liquid contact vessel of conventional sizing such as 3 feet in diameter and 12 feet in height and which has gas inlet means 2 and sparging means 3 for dispersing the incoming gaseous stream into small bubbles and the aqueous solution 4. Usually the height of the vessel will be about twice the height of the aqueous solution, thus a typical height of the aqueous solution in a 15-20 foot vessel would be in the range of 8 to 10 feet. While it is preferred that the sour gas entering the vessel for treatment contain sufficient oxygen according to the process of the present invention, separate air injections means 5 may be provided for adding oxygen to the incoming sour gas before the gas enters the contact vessel. The contact vessel is provided with a drain means 6 which can be used to empty the vessel when the solution in the vessel reaches a predetermined sulfur content, such as 5 or 10 percent by weight sulfur. Outlet means 6 can also be used to draw off daily amounts of the solution which may be replaced by equivalent amounts of fresh solution through inlet means 7 in order to maintain the desired level of chelate concentration in the contact vessel and to remove sulfur from the system. In many instances, such makeup solution may not be employed if it desired that the chelate solution be used until it is sufficiently decomposed that it is no longer sufficiently effective in removing hydrogen sulfide, then the entire solution is discarded. The contact vessel is also provided with a sweet gas outlet 8 and if desired, may be fitted with demisting means 9. The contact vessel may also be fitted with minimum level and maximum level taps 10 and 11 for monitoring and/or controlling the level of the aqueous solution in the contact vessel. It is desirable that drain 6 and taps 10 and 11 be provided with a holding tank 12 in which the spent solution can be held until transport is available to dispose of the spent solution. Likewise, it is desirable to provide a holding tank 13 for makeup solution and providing fresh solution to the contact vessel. In addition to the features shown in the drawing, the contact vessel can also be equipped monitoring equipment to monitor pH, color of the solution, level of the solution, the presence of foaming and other conditions which may be desirable to monitor for control of the process.

EXAMPLE I

To 10 liters of water were added 45 grams EDTA, 34 grams $FeSO_4.7H_2O$ and 650 g $NaHCO_3$, nitrogen gas which contain about 100 ppm $H_2S$, 9000 ppm oxygen and a small amount of $CO_2$ flowed through the above aqueous solution at about 2 scfm in a column 4 inches in diameter and 4 feet in length at 25 psig. The solution had a pH of 7.5. The unit will ran 72 hours with no detectable $H_2S$ exiting the column. The sulfur precipitate in the solution at the end of the test was 0.35 percent by weight.

EXAMPLE II

In this example, a field test was done at the Yorba Linda California gas field in the same 4 inch diameter vessel used in Example I and using a solution according to the present invention containing 1300 ppm ferric iron with 10 g/l EDTA chelating agent and 60 g/l $NaHCo_3$ buffer for pH of about 7.7. The following data was collected from this operation.

| YORBA LINDA FIELD TEST | | | | | |
|---|---|---|---|---|---|
| Lapsed Time (Hrs.) | $H_2S$ In PPMV | $H_2S$ Out PPMV | Oxygen In PPMV | Gas Rate SCFM | Pressure PSIG |
| 2.0 | 5000 | 0 | | | |
| 2.5 | | 0 | 5000 | | |
| 4 | | 600 | | | |
| 5 | 2800 | 0 | 55000 | | |
| 21.5 | | 0 | | | |
| 22.5 | 4000 | 800 | | | |
| 24.5 | 3800 | 10 | | 0.30 | 25 |
| 25.5 | 3400 | 5 | | 0.30 | 25 |
| 44.5 | 2800 | | 40000 | 0.40 | 25 |

At this point the test was interrupted because of gas feed problems of a mechanical nature. The solution was removed from the test vessel, 1.5 feet of ¼"55 Pall rings were placed in the vessel and new solution of 1200 ppm ferric iron, 8 g/l EDTA and 100 g/l $NaHCo_3$ was placed in the vessel for a liquid height of 3 feet. The test was resumed with the following results.

| YORBA LINDA FIELD TEST | | | | | |
|---|---|---|---|---|---|
| Lapsed Time (Hrs.) | $H_2S$ In PPMV | $H_2S$ Out PPMV | Oxygen In PPMV | Gas Rate SCFM | Pressure PSIG |
| 1.0 | | 0 | | | |
| 2.0 | 3000 | 0 | 35000 | | |
| 2.1 | | 0 | 20000 | 0.50 | 25 |
| 3.0 | | 0 | 35000 | 0.40 | |
| 4.0 | | | | 0.50 | |
| 4.1 | 3700 | 0 | 5000 | | |
| 4.6 | 3500 | 0 | 35000** | | |
| 4.7 | | | 14000 | | |
| 4.9 | | | 20000 | | |
| 5.1 | | 0 | | | |
| 5.5 | 3000 | 0 | 20000 | 0.50 | 25 |
| 22.7 | | | 35000* | | |
| 28.0 | 2000 | 0 | 35000 | 0.35 | 16 |
| 28.5 | | | 25000 | | |
| 29.0 | 2200 | | 20000 | 0.70 | 15 |
| 29.5 | | | 20000 | 0.50 | |
| 30.3 | 2200 | 0 | 19000 | | |
| 45.0 | 2200 | 0 | 60000 | 0.40 | 16 |
| 46.3 | | | 20000 | 0.50 | |
| 51.5 | 1700 | 0 | 5000 | 0.30 | |
| 52.1 | | | 4000 | 0.50 | |
| 54.2 | 2000 | | | | |
| 54.7 | | 0 | 12999 | | |
| 57.0 | 2200 | 0 | 10000 | 0.50 | 16 |
| 69.0 | 2700 | 0 | 22000 | 0.35 | 18 |

-continued

YORBA LINDA FIELD TEST

| Lapsed Time (Hrs.) | $H_2S$ In PPMV | $H_2S$ Out PPMV | Oxygen In PPMV | Gas Rate SCFM | Pressure PSIG |
|---|---|---|---|---|---|
| 69.7 | | | | 0.35 | |
| 70.0 | | | 10000 | 0.75 | |
| 70.1 | | 1 | | | |
| 70.2 | | | 7000 | | |
| 70.5 | | 1 | 5500 | 0.65 | |
| 70.7 | | | 8000* | | |
| 72.5 | 3200 | 0 | 20000 | | |
| 74.5 | | | | 0.50 | |
| 74.7 | 2600 | 0 | ** | 1.00 | 14 |
| 75.0 | | | | 0.50 | |

\* = Air addition started.
\*\* = Air addition stopped.

EXAMPLE III

A test using the same vessel and solution of the second composition in Example II was conducted at the Huntington Beach California gas field and the following data was collected.

HUNTINGTON BEACH FIELD TEST

| Lapsed Time (Hrs.) | $H_2S$ In PPMV | $H_2S$ Out PPMV | Oxygen In PPMV | Gas Rate SCFM | Pressure PSIG |
|---|---|---|---|---|---|
| 0 | 95 | 0 | 9000 | 1.75 | 25 |
| 0.7 | | | | 1.60 | 30 |
| 1.0 | | 0 | 9000 | 1.60 | 30 |
| 17.0 | 80 | 0 | 11000 | 1.60 | 32 |
| 19.0 | 85 | 0 | | | |
| 21.0 | 80 | 0 | | | |
| 23.2 | 90 | 0 | 12000 | 1.60 | 30 |
| 25.3 | 85 | 0 | 11000 | | 30 |
| 41.0 | 65 | 0 | 16500 | 1.40 | 32 |
| 42.2 | 65 | 0 | 14000 | 1.60 | |
| 44.5 | 70 | 0 | 15000 | 1.60 | |
| 47.5 | 65 | 0 | 14000 | 1.60 | |
| 48.5 | | | | | |
| 49.5 | 70 | 0 | | | |
| 65.0 | 90 | 0 | 9000 | 1.60 | 35 |
| 66.3 | 90 | 0 | | 0.50 | 2 |
| 66.5 | | 0 | | | |
| 68.0 | | 0 | | | |
| 70.0 | | 0 | | | |
| 71.3 | | 0 | | | |
| 72.8 | 60 | 0 | 9000 | 0.50 | 2 |

EXAMPLE IV

A laboratory test was run in the 4 inch diameter vessel of Example to demonstrate the increase of dispersed sulfur precipitate in the solution on the process. The solution composition
Volume = 1.5 liters $H_2O$
11 g/l EØTA
16 g/l $FeSO_4$
20 g/l $NaHCO_3$
50 ppmw Anti-foamer, Dow Corning FG10
40 ppmw Daxad 14B, dispersant
The test run conditions were:
T = ambient
P = 46 psig
$CO_2$ flow = 1.7 SLPM The gaseous stream was nitrogen containing the above $CO_2$, the following amounts of $H_2S$ and 15.5 volume L percent $O_2$.

| Lapsed Time (Hrs.) | Flow Rate in SLPM | $H_2S$ in PPMV | $H_2S$ out PPMV |
|---|---|---|---|
| 5 | 18.92 | 1550 | 5 |
| 10 | 18.92 | 1550 | 130 |
| 15 | 18.96 | 1550 | 145 |
| 20 | 18.96 | 1300 | 60 |
| 25 | 19.82 | 1500 | 20 |
| 30 | 25.04 | 1600 | 80 |
| 35 | 25.04 | 1700 | 40 |
| 40 | 18.53 | 2300 | 180 |
| 45 | 18.04 | 2000 | 600 |
| 50 | 18.04 | 2050 | 600 |
| 55 | 18.04 | 2100 | 800 |

At the end of this test, the sulfur dispersed in the solution was at a level of 8 percent by weight. It should be noted that the pH in this test was not controlled and was allowed to become very low. Therefore, the $H_2S$ removal was not as complete as it would have been at alkaline pH, but the purpose of this example was to demonstrate the high weight percent of sulfur dispersed in the solution.

EXAMPLE V

In an economic comparison between the process of the present invention and a conventional sodium nitrite solution process, the present invention operating costs are about one-third the costs of operating a sodium nitrite process. For a 600 MCFD gas flow of 500 ppmv $H_2S$ being reduced to 4 ppmv $H_2S$ (about 25.5 lbs/day), the following comparison can be made:

| | Present Invention | Sodium Nitrite |
|---|---|---|
| Gals/Charge | 425 | 170 |
| Days/Charge | 16 | 12 |
| $/lb. $H_2S$ Removed (chemical cost) | 0.19 | 2.38 |
| Chemical Cost $/Yr. | 1,900 | 23,500 |
| Transport Cost $/Yr | 5,500 | 2,900 |
| Disposal Cost $/Yr | 1,000 | 500 |
| Total Annual Cost, $ | 8,400 | 26,900 |

We claim:

1. A process for removing hydrogen sulfide from a gaseous stream which comprises contacting said hydrogen sulfide containing gaseous stream with an aqueous solution comprising a water soluble oxidized polyvalent metal chelate catalyst to convert the hydrogen sulfide to particulate elemental sulfur and reduce the polyvalent metal chelate catalyst, said contacting taking place in the presence of sufficient oxygen for oxidizing the reduced polyvalent metal chelate catalyst to its oxidized state, wherein the aqueous solution contains an effective amount of a dispersing agent for maintaining the particulate elemental sulfur in dispersed suspension in the aqueous solution, thereby forming a suspension of the particulate elemental sulfur in said aqueous solution, continuing said contacting until the suspended particulate elemental sulfur reaches at least about 2 percent by weight of the aqueous solution, discarding at least a portion of the aqueous solution containing the suspension of particulate elemental sulfur, and replacing the discarded aqueous solution with fresh aqueous solution and said water soluble oxidized polyvalent metal chelate catalyst for contact with additional hydrogen sulfide containing gaseous stream.

2. A process according to claim 1 wherein said contacting is continued until the particulate elemental sulfur constitutes at least about 4 percent by weight of the aqueous solution.

3. A process according to claim 2 wherein said contacting is continued until the particulate elemental sulfur constitutes at least about 5 percent by weight of the aqueous solution.

4. A process according to claim 3 wherein said contacting is continued until the particulate elemental sulfur constitutes at least about 8 percent by of the aqueous solution.

5. A process for removing hydrogen sulfide from a gaseous stream which comprises contacting said hydrogen sulfide containing gaseous stream with an aqueous solution comprising water soluble oxidized polyvalent metal chelate catalyst to convert the hydrogen sulfide to particulate elemental sulfur and reduce the polyvalent metal chelate catalyst, said contacting taking place in the presence of sufficient oxygen for oxidizing the reduced polyvalent metal chelate catalyst to its oxidized state, thereby forming a suspension of particulate elemental sulfur in said aqueous solution, wherein the aqueous solution contains an effective amount of a dispersing agent for maintaining the particulate elemental sulfur in the form of dispersed particles and maintaining said sulfur particles in dispersed suspension in the aqueous solution in the absence of significant frothing or settling of the particulate sulfur and wherein the dispersed and suspended sulfur particles are present in an amount of at least about 2 percent by weight of the aqueous solution.

6. A process according to claim 5 wherein the sulfur particles constitute at least about 4 percent by weight of the aqueous solution.

7. A process according to claim 6 wherein the sulfur particles constitute at least about 5 percent by weight of the aqueous solution.

8. A process according to claim 7 wherein the sulfur particles constitute at about 8 percent by weight of the aqueous solution.

9. A process according to claim 10 wherein the sulfur particles constitute at about 10 percent by weight of the aqueous solution.

10. A process for removing hydrogen sulfide from a gaseous stream which comprises contacting said hydrogen sulfide containing gaseous stream with an aqueous solution comprising a water soluble oxidized polyvalent metal chelate catalyst to convert the hydrogen sulfide to particulate elemental sulfur and reduce the polyvalent metal chelate catalyst, said contacting taking place in the presence of sufficient oxygen for oxidizing the reduced polyvalent metal chelate catalyst to its oxidized state, wherein the aqueous solution contains an effective amount of a dispersing agent for maintaining the particulate elemental sulfur in dispersed suspension in the aqueous solution, thereby forming and maintaining in suspension the particulate elemental sulfur in said aqueous solution wherein the average particle size of the particulate elemental sulfur is less than about 15 microns and wherein the amount of dispersed and suspended elemental sulfur present in said solution is at least about 2 percent weight of the aqueous solution.

11. A process according to claim 10 wherein the average particle size of the particulate elemental sulfur is less than about 10 microns.

12. A process according to claim 11 wherein the average particle size of the particulate elemental sulfur is less than about 5 microns.

* * * * *

UNITED STATES PATENT AND TRADEMARK OFFICE
CERTIFICATE OF CORRECTION

PATENT NO. : 5,004,588

DATED : April 2, 1991

INVENTOR(S) : Scott P. Nisula, et al

It is certified that error appears in the above-identified patent and that said Letters Patent is hereby corrected as shown below:

On the title page, item [63] under Related U.S. Application Data, "January 15, 1980" should read --January 15, 1988--.

Signed and Sealed this

Sixth Day of July, 1993

Attest:

MICHAEL K. KIRK

*Attesting Officer*  *Acting Commissioner of Patents and Trademarks*